Sept. 15, 1936. C. S. HEALY 2,054,463
APPARATUS FOR TESTING THE VISCOSITY OF OIL
Filed April 19, 1935 5 Sheets-Sheet 2
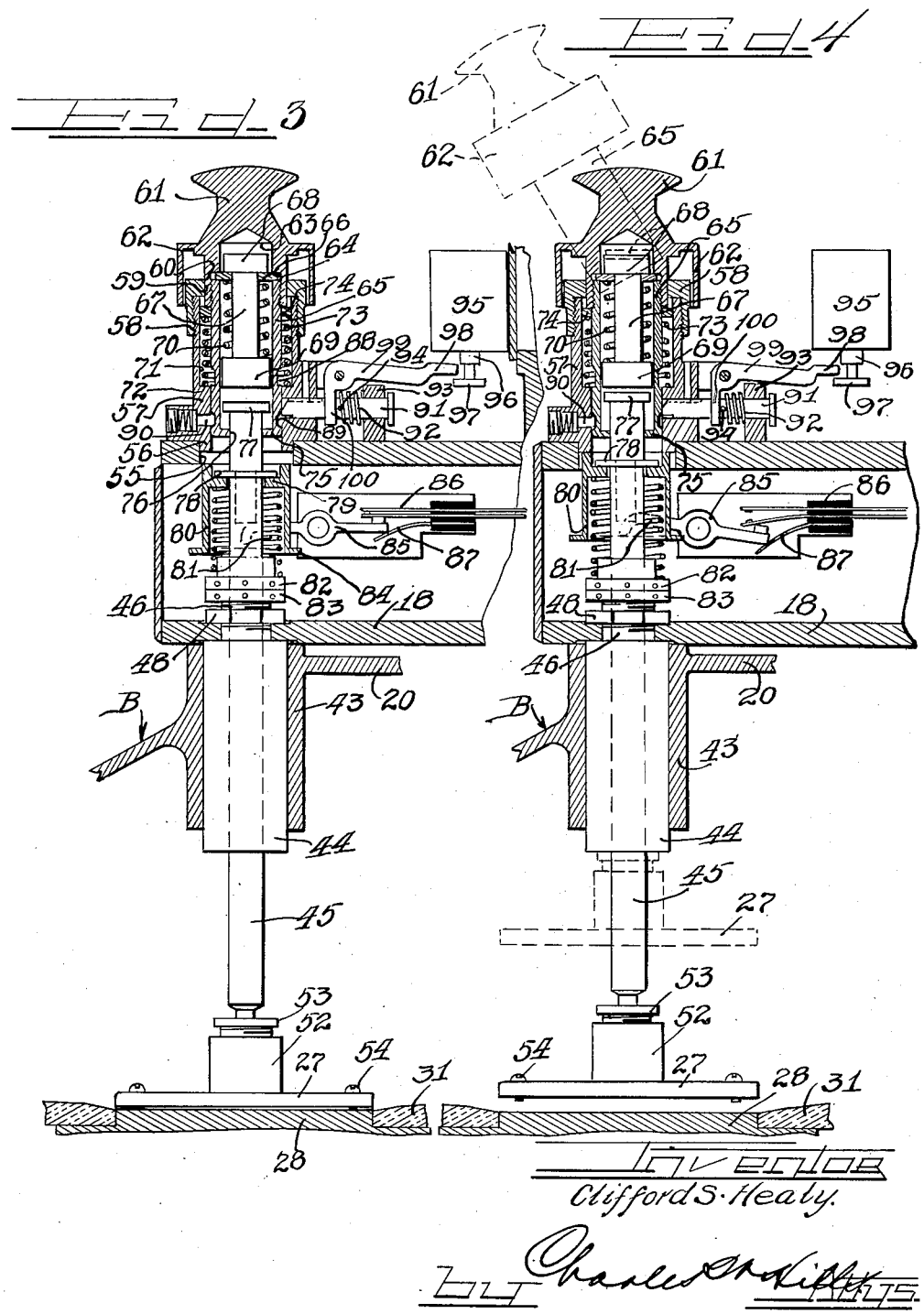

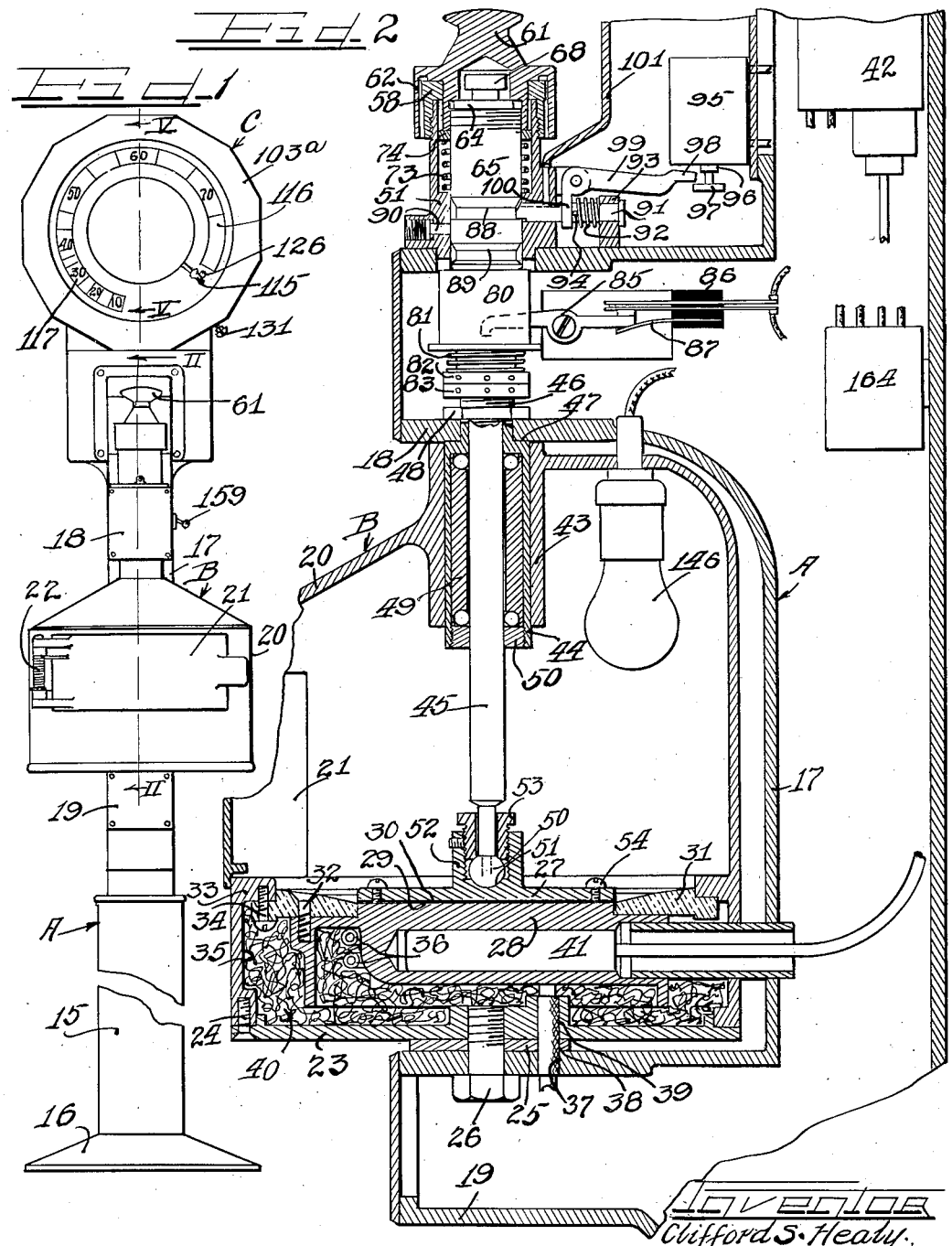

Sept. 15, 1936.   C. S. HEALY   2,054,463
APPARATUS FOR TESTING THE VISCOSITY OF OIL
Filed April 19, 1935    5 Sheets-Sheet 3
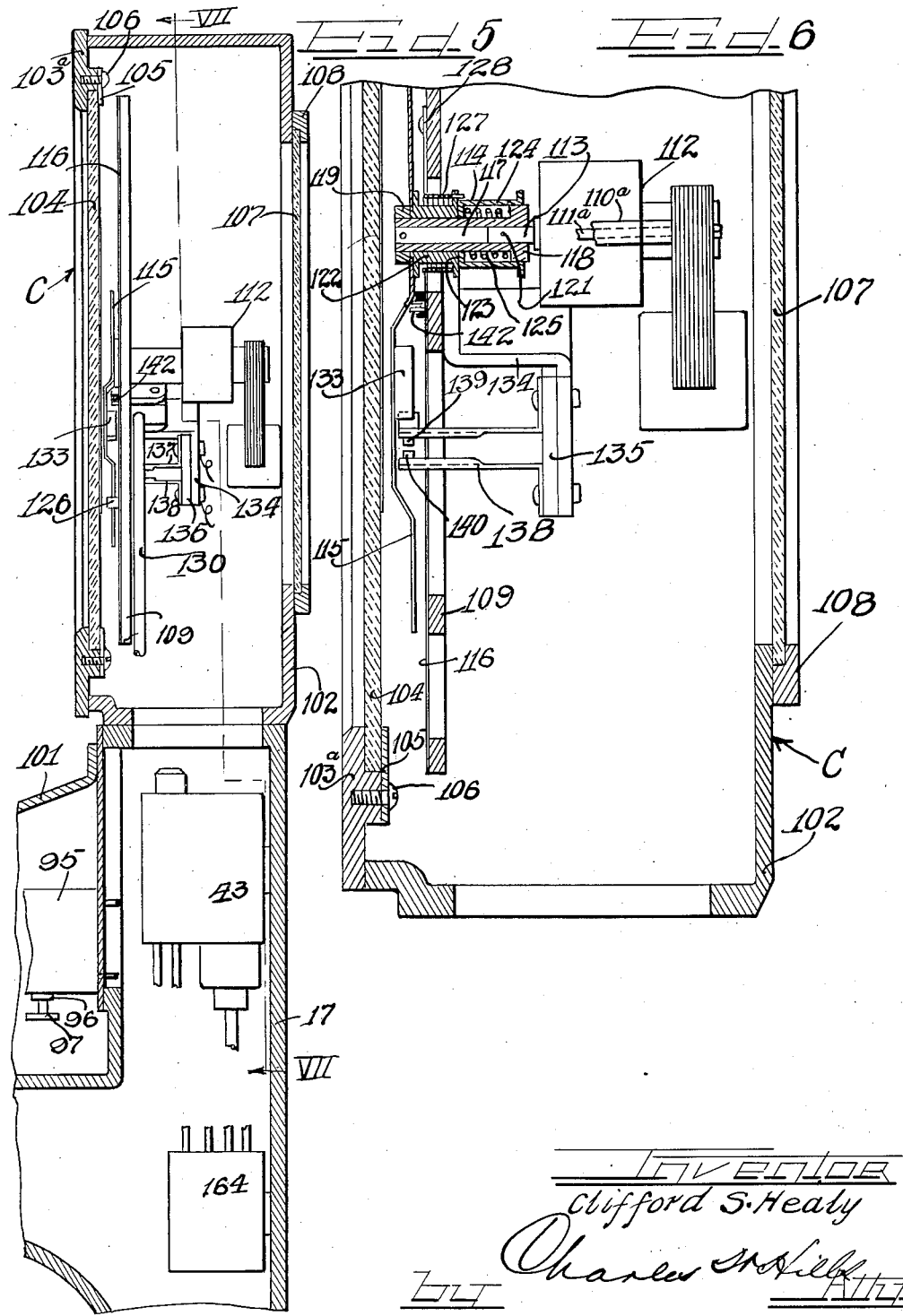

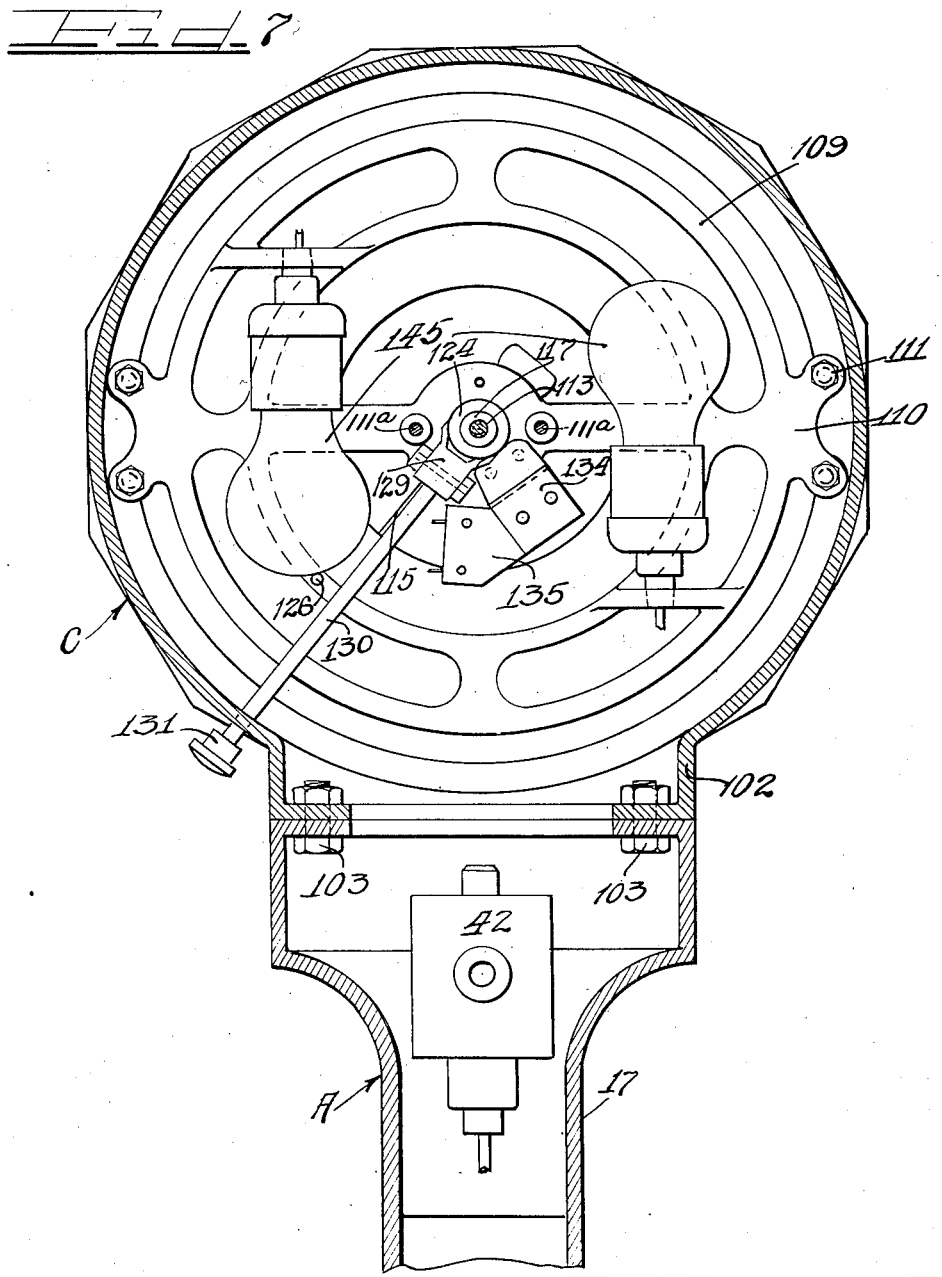

Sept. 15, 1936.   C. S. HEALY   2,054,463
APPARATUS FOR TESTING THE VISCOSITY OF OIL
Filed April 19, 1935   5 Sheets—Sheet 5
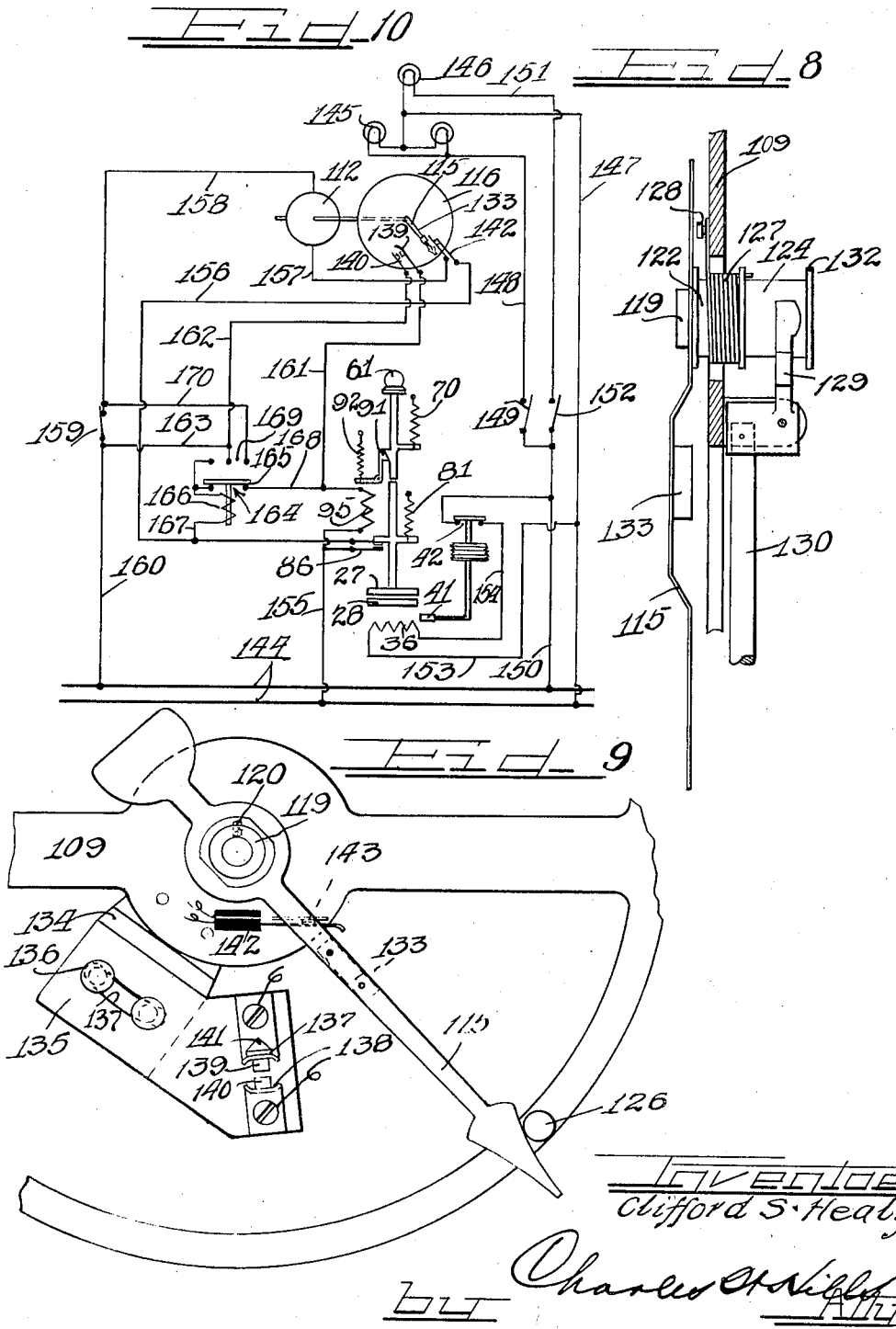
Inventor
Clifford S. Healy Patented Sept. 15, 1936

2,054,463

UNITED STATES PATENT OFFICE 2,054,463

APPARATUS FOR TESTING THE VISCOSITY OF OIL

Clifford S. Healy, Chicago, Ill.

Application April 19, 1935, Serial No. 17,190

14 Claims. (Cl. 265—11)

The present invention relates in general to apparatus for testing the viscosity of liquids such as oil, and is more particularly concerned with improvements and refinements in the device disclosed in my copending application Serial No. 659,300, filed March 2, 1933.

In my copending application there is disclosed an apparatus which determines the viscosity of a liquid such as oil by testing the resistance which a film of the oil offers to the separation of two surfaces between which the oil is placed, and by timing the interval or duration of the resistance of this film to the separation of the surfaces.

One of the objects of the present invention relates to the provision of an apparatus of the herein described character, wherein the testing operation and the timing of its interval or duration will be automatically started and terminated, thereby eliminating any errors which might result through the misjudgment of an operator or attendant.

A further object is to provide control means manually operable by an attendant for rendering the timing means inoperative, when it is desired to initially bring the testing plates into close position for bringing them to a desired temperature, and automatic means to render the manually controlled means inoperative to stop the timing means once the timing of the testing operation has started. This is advantageous in that it prevents the attendant or operator from stopping the timing mechanism before the test has been concluded, to thereby secure an indicated reading which would not be a true indication of the viscosity of the liquid under test.

Another object of the invention is to provide control means for automatically stopping the timing means in the event that the maximum capacity of the indicating mechanism is reached.

It is also an object to provide means for automatically starting the timing mechanism upon movement of the testing plates to close position and thereafter upon the lapse of a predetermined interval, automatically start the actual testing operation, whereby the starting of the testing operation and timing operation will be coincident, and it will be unnecessary to rely upon the judgment of the operator in simultaneously starting these two operations.

Still another object resides in an improved mounting for the movable test plates embodying a construction which enables the plates to be moved to apart position and locked in such position, thereby leaving both hands of the operator free for use in cleaning the plates and getting the apparatus ready for making a test.

Other objects and features of this invention will more fully appear from the following detailed description taken in connection with the accompanying drawings, which illustrate a single embodiment thereof, and in which Figure 1 is a view in elevation of a device embodying the principles of the herein described invention;

Figure 2 is an enlarged fragmentary sectional view showing the details of the testing instrumentalities and their cooperative arrangement, taken substantially on line II—II of Figure 1;

Figures 3 and 4 are enlarged fragmentary sectional views showing the relative positions of the testing instrumentalities at the beginning and the termination of the testing interval, the latter figure in addition showing in dotted line the separation of the plates for cleaning purposes;

Figure 5 is an enlarged fragmentary sectional view, partly in elevation, showing the details of the timing and indicating mechanism, taken substantially on line V—V of Figure 1;

Figure 6 is an enlarged fragmentary sectional view through the indicator head to show details of the clutch mechanism between the driving motor and the indicating pointer;

Figure 7 is an enlarged fragmentary sectional view looking from the rear of the indicating head, taken substantially on line VII—VII of Figure 5;

Figure 8 is a detail view illustrating the operative parts of the clutching mechanism between the driving motor and the indicating pointer;

Figure 9 is an enlarged detail view showing the control switches associated with the indicating pointer; and Figure 10 is a schematic diagram showing the electrical connections between the various parts of the apparatus.

As shown on the drawings:

In the illustrated embodiment of the present invention there is disclosed in Figure 1 a device or apparatus for testing the viscosity of a liquid such as oil, and which embodies the principles of the invention to be hereinafter described. In the main, the apparatus comprises a supporting frame structure A, the oil testing instrumentalities as generally indicated at B, and a head portion C containing the timing mechanism and pointer and dial arrangement for indicating the results of the test.

The supporting frame structure A comprises a pedestal 15 which is secured to and projects upwardly from a base 16. Swivelly supported in the pedestal 15 is a hollow standard 17 which supports at its upper end the head portion C. This standard is provided with a pair of forwardly projecting arms 18 and 19 in vertically aligned and spaced relationship. These arms serve as supports for the liquid testing instrumentalities.

Disposed between the arms 18 and 19 is a metallic housing 20 of substantially cylindrical form which is provided with an entrance opening on its forward side. This opening is normally closed by a hinged door 21 which is actuated to closed position by means of a spring 22.

The housing is provided with a separately formed bottom 23 which is secured around its periphery to the wall portion of the housing as by screws 24. This bottom adjacent its center engages a spacing block 25 which is disposed between the bottom and the arm 19. The housing is secured in position by means of a bolt 26 which extends through the upper portion of the arm 19, the spacing block 25, and threadedly engages the bottom of the housing.

Cooperatively associated in the housing is an upper plate element 27 and lower plate element 28 which are supported for relative movement into close and apart relationship.

The lower plate element is in this instance centrally disposed of the housing and rigidly supported therefrom. This plate element is in the form of a casting having a raised portion which defines a contact surface 29 for cooperation with the lower surface 30 of the upper plate element.

Surrounding the raised portion of the lower plate element is an annular member 31, which is preferably of fibrous material so as to form a heat insulating medium, this member being secured to the lower plate casting as by a plurality of screws such as shown at 32. The peripheral edge of this member is supported from an integrally formed inwardly extending flange 33 as by screws 34. This flange, it will be observed is upwardly spaced from the bottom of the housing and cooperates with the ring member 31 and the lower plate casting to form a partition in the housing and cooperates with the bottom of the housing to form a closed compartment or chamber 35 beneath the lower plate member 28.

The chamber 35 contains an electrical heating element 36 by means of which the lower plate member 28 is maintained at a desired temperature. Electrical connections to the heating element 36 are brought into this chamber by appropriate openings 37, 38 and 39 of the arm 19, the spacing member and the bottom of the housing respectively.

The chamber 35 is further insulated against changes of temperature by packing the chamber with steel wool or other material such as generally used for producing dead air spaces. This steel wool is indicated at 40. Control of the heating element 36 is accomplished through the use of any of the well-known types of thermostatic control switches. In the present instance, use is made of the type comprising a bellows which is interconnected thru a tube to a bulb, the bellows, tube and bulb containing a volatile liquid, the bulb in the present instance being shown at 41 as embedded in the lower plate element casting. The switch contacts of the thermostatic control switch are arranged in circuit with the electrical supply to the heating element 36, as will be more fully explained in connection with the control circuits of the present invention. The contacts with associated bellows of the thermostatic switch are assembled as a unit device 42 and mounted within the standard 17.

The upper end of the housing 20 is provided with a tubular portion 43 having a vertically disposed axis and surrounding a tubular guide member 44 for a reciprocable plunger 45. The guide member 44 is contracted at its upper end to define a threaded portion 46 and an abutment shoulder 47. This guide member is supported in the arm 18 by mounting the contacted portion 46 in a suitable aperture in the lower face of the arm 18, a nut 48 being screwed against the lower wall of the arm to cooperate with the shoulder 47 and hold the guide member in place. Mounted within the guide member is an antifriction bearing 49 which is secured against removal by means of an end member 50 which is in threaded engagement with the lower end of the guide member and provided with a central aperture through which the plunger 45 extends.

The lower end of the plunger 45 is connected to the upper plate member 27 by means of a universal connection. This connection is preferably formed by providing a spherical head 50 on the lower end of the reciprocable plunger, which is arranged to seat against a substantially spherical or rounded surface 51 formed in a boss 52 which is disposed at the center of the upper plate element and projects upwardly therefrom. Removal of the head 50 from its seat is prevented by means of a bushing 53 which is screwed into the boss and is in engagement with the top side of the head 50.

In the use of the present invention for testing a liquid such as oil, it is desirable to establish a film of oil of predetermined thickness between the upper and lower plate elements. For securing a film of oil of predetermined thickness, it will be observed that the plates are maintained separated a slight amount when in close position. This is accomplished by means of spacing screws as shown at 54 which extend through the upper plate and project the desired distance beyond its lower surface. Abutment of the lower ends of these screws with the upper surface of the lower plate serves to space the upper plate from the lower when the plates are in close position.

Referring to Figures 2, 3 and 4, the operating mechanism for raising and lowering the upper plate and applying pressure thereto, is shown in detail. The upper wall of the arm 18 is provided with an aperture 55 for receiving thereinto a depending flange 56 of a tubular guide bracket 57 which is secured in an upright position on the upper surface of the arm 18. This bracket at its upper end is provided with a screw cap 58 having a central opening 59 for reciprocably receiving therein an internal depending guide flange 60 of a hand knob 61. The guide flange 60 cooperates with an outwardly spaced guide flange 62 extending over the outer surface of the cap 58 for guiding the movement of the knob for a limited distance. The knob 61 is provided with a central socket 63 which is slightly less in diameter than the internal diameter of the flange 60, thus defining an abutment shoulder 64. A tubular plunger 65 has its upper end threaded into the flange 60 and cooperates with the shoulder 64 to clampingly engage a washer 66 which has a stem 67 reciprocably mounted in its central aperture.

The stem 67 depends from the washer 66 and is provided with a head 68 at its upper end which is disposed in the socket portion 63, and a head 69 at its lower end which is disposed within the tubular plunger 65. This stem is normally forced to its lowermost position with its head 68 abutting the washer 66 by means of a compression spring 70 having one end bearing against head 69 and its other end bearing against the washer 66.

The interior of the tubular bracket 57 is provided throughout a portion of its length with a bore of increased diameter as shown at 71 so that the interior surface in this portion is outwardly spaced from the outer surface of the tubular plunger 65 to provide an abutment shoulder 72 and sufficient space for a compression spring 73. This spring at its lower end bears against the shoulder 72 and at its upper end engages a washer 74 which is free to move in an axial direction between the tubular plunger and the tubular guide bracket. It will be seen that the washer 74 is thereby resiliently forced into engagement with the lower end of the internal guide flange 60, and that the cap 58 projects over the end of the tubular guide bracket a sufficient amount to prevent displacement of the washer 74 from the guide brackets when the knob is raised sufficiently to withdraw the internal guide flange past the cap 58.

The lower end of plunger 65 is inwardly deflected as shown at 75 to define a centrally disposed aperture 76 adapted to reciprocably receive therethrough the upper end of plunger 45. The uppermost end of the plunger 45 is provided with a head portion 77 which is adapted to be engaged by the inwardly deflected portion 75 of the plunger, when the plunger is raised, and engaged by the head 69 of the stem 67 when the plunger is pushed down.

Inwardly spaced from the head 77 is a circumferentially extending collar 78 which is secured to the reciprocable plunger 45 and adapted to be engaged on its lower surface by an internal flange 79 adjacent the uppermost end of a tubular sleeve 80 which is of slightly less external diameter than the opening 55 of the arm 18. The sleeve 80 is normally disposed within the hollow portion of arm 18 and is forced upwardly against the collar 78 by means of a compression spring 81 having its upper end bearing against the internal flange 79 and its lower end against an adjustable nut 82 threaded on the contracted portion 46 of the tubular guide member 44. Cooperatively associated with the adjusting nut 82 is a lock nut 83 which may be utilized for locking the adjusting nut in adjusted position. Adjustment of the nut 82 will vary the amount of pressure exerted by the compression spring 81 for a purpose which will later be evident.

The lowermost end of the sleeve 80 is outwardly deflected to form an outstanding circumferentially extending flange 84. The flange 84 is adapted to engage one end of a rocker arm 85 forming a pivotal lever for actuating suitable switch means 86 mounted within the interior of the hollow arm 18. Any desirable type of switch means may be utilized in this connection so long as it embodies electrical contacts which are normally in closed position. In the present instance the rocker arm 85 is normally rotated in a counter-clockwise direction by a leaf spring 87 so that it engages the movable contacts of a pair of cooperable contacts, this movable contact normally having a tendency to move to open position. The spring 87 will normally maintain the other end of the rocker arm 85 in a position adjacent the flange 84 so that when the sleeve 80 is raised, contact is made with the associated end of the rocker arm and it will be moved to such a position as to open the switch contacts.

The outer surface of the tubular plunger 65 is provided with a pair of circumferentially extending grooves which are vertically spaced relative to each other, these grooves being indicated respectively at 88 and 89. In the normal position of the plunger 65, the groove 89 will receive the inner end of a spring actuated detent pin 90 so as to retain the tubular plunger against easy displacement in an upper or lower direction. It will be noted in this connection that the edges of groove 89 are beveled, thus enabling ready displacement of the tubular plunger simply by the application of a small pressure on the knob 61 in an upward or downward direction.

It will be observed that when the tubular plunger 65 is pushed down against the resistance of compression springs 70 and 73, a reciprocable latch member 91 will have its innermost end forced into the groove 88 by a compression spring 92 which is disposed with one end bearing against a supporting bracket 93 for the latch member and its other end against a pin 94 extending through the latch member.

The latch member 91 is arranged to be actuated to unlatched position by means of a solenoid having an operating coil 95 and a solenoid plunger 96. The lower end of the solenoid plunger is provided with a head 97 which is arranged to engage an end 98 of a bell crank lever 99 which has its other end 100 formed into a yoke which straddles the latch member and is disposed on the opposite side of pin 94 so that when the solenoid is energized, the latch member 91 will be moved to unlatched position relative to the tubular plunger 65. As shown in Figure 2, the latching mechanism with its actuating coil and solenoid is disposed within a suitable housing 101.

There are three positions in the operation of the testing mechanism just described. Figure 4 shows the normal position of the cooperative instrumentalities, which is also the position of its parts at the conclusion of the test of a specimen of oil. Figure 2 shows the position of the parts when the mechanism is set for beginning the test, and Figure 3 the position of the parts when the actual test has begun.

With the parts in normal position as shown in Figure 4, the upper plate element 27 may be raised to the position shown in dotted lines to facilitate the cleaning of the plates or for the placing of a new specimen of oil on the lower plate 28 for testing. The plate 27 is raised by grasping the knob 61 and withdrawing the plunger 65 to the position shown in dotted line. During this movement of the plunger 65, its inwardly deflected flange 75 engages the head 77 of the reciprocable plunger 45. The reciprocable plunger 45 may then be raised until the bushing 53 strikes against the lowermost end of guide member 44, in which position the tubular plunger 65 with the hand knob 61 may be tilted until it is at such an angle that the weight of the plunger 45 and upper plate 27 and associated elements is insufficient to displace or again pull the plunger into the tubular bracket until the plunger 65 is manually aligned. The upper plate 27 may be left in raised position as shown by dotted lines for an indefinite period and the attendant who may be conducting the test will have both hands free for cleaning the plate members or for other use in connection with the testing of the oil specimen.

As soon as the specimen of oil has been placed on the lower plate 28, the upper plate is returned to normal position whereupon a downward pressure of the hand on hand knob 61 will initially cause spring 73 to be compressed until the head 69 engages the head 77. At this point, further downward movement of the knob 61 will additionally compress spring 73 and will start compressing spring 70 and force the upper plate against the pressure of these two springs into close position relative to the lower plate 28. This downward movement of the upper plate will cause the collar 78 to move sleeve 80 downwardly against the pressure of spring 81. When the proper amount of pressure has been applied, the tubular plunger 65 will have assumed such a position that the latching member 91 will enter groove 88 and the mechanism will be latched in set position as shown in Figure 2.

If the solenoid coil 95 is now energized, which is accomplished through the operation of the timing mechanism which will subsequently be described, the latch member 91 will be released from the groove 88 as shown in Figure 3, whereupon the springs 70 and 73 will force the tubular plunger 65 upwardly until the spring actuated detent 90 engages grooves 89. In this position, it will be observed that the only force which is exerted to separate the plates 27 and 28 is by virtue of spring 81. The actuating force of spring 81 is resisted by the surface tension exerted by the film of oil between the plates 27 and 28. It is therefore evident that it will take a certain length of time for the force exerted by spring 81 to overcome this surface tension, and it has been found that this interval of time may be taken as a direct measure of the viscosity of the specimen of oil under test.

When the surface tension of the oil is overcome, the plates 27 and 28 will be moved by spring 81 to relative apart positions as shown in Figure 4, this being the end of the test.

It will be noted that during the testing operation when the plates 27 and 28 are in close position, the switch 86 has its contacts closed and that when the test is concluded and the upper plate element has moved to the position shown in full lines in Figure 4, the contacts of switch 86 are automatically opened. Advantage is taken of this operation of the switch 86 to start and stop the timing mechanism.

The head C containing the timing and indicating mechanism comprises a casing 102, as shown in Figures 5, 6 and 7, which is secured as by bolts 103 to the top of standard 17. The forward side of the casing 102 is formed by a ring-shaped member 103a having a transparent window 104 secured therein. This window may be secured in any desirable manner, however, in the present case, there are a plurality of securing lugs 105 which are held in place around the periphery of the window by means of screws 106 which secure the lugs to the ring 103a. If desired, the rear wall of the casing 102 may be solid or may be provided with a window 107 which is held in place over a suitable opening by a securing ring 108.

Supported within the casing is an annular bracket 109 having lateral lugs 110 which are secured as by bolts 111 to the wall of the casing, which serves as a support for the timing and indicating mechanism.

Supported on and in the rear of bracket 109 by means of suitable spacer sleeves 110a and bracket bolts 111a is a driving motor of the synchronous type such as ordinarily used in connection with electric clocks. This motor has a driving shaft 113 which is connected through a clutch 114 to a pointer 115 which is arranged to traverse a dial plate 116 on the forward side of bracket 109. This dial plate is inscribed with indicia such as indicated at 117 which indicate oil viscosity.

Secured to the driving shaft of the motor is a shaft extension member 117 of tubular construction and provided at its innermost end with a peripheral outstanding flange 118 and its outer end with a collar 119, this collar being secured to the shaft extension by a set screw 120 as shown in Figure 9. The shaft extension is secured to the shaft 113 for rotation therewith as by a pin 121.

The pointer 115 is supported on a sleeve 122 which is rotatably mounted on the shaft extension. This sleeve is provided with end flanges, one of these flanges being contiguous and serving as a support for the pointer 115 and the other end flange defining a clutching surface 123 which is adapted to be frictionally engaged by the closed end of a cup-shaped member 124, this member being axially slidable over the shaft extension and the flange portion thereof 118. The member 124 has disposed therein a compression spring 125 which surrounds the shaft extension and has one end bearing against the peripheral flange 118 and its other end against the closed end portion of the member, whereby this member is forcibly actuated into engagement with the surface 123, the member 124 thereby cooperating with the collar 119 to clampingly engage the sleeve 122 so that it will be rotated when the motor is running.

The pointer 115 is normally held against a stop pin 126, and when the motor is operating, the pointer will be rotated in a clockwise direction over the indicating dial. Movement of the pointer is resisted by a coil spring 127 which surrounds the sleeve 122 and has one end anchored in one of the end flanges thereof and its other end anchored as at 128 to the bracket 109.

For releasing the friction clutch just described to enable the pointer 115 to be returned by the spring 127 to its position against the stop pin 126, there is provided a clutch releasing mechanism as will be clearly understood by reference to Figure 8. Straddling the cup shaped member 124 is a yoke arm 129 which is pivoted for swinging movement by means of a push rod 130 which extends through the casing and has mounted on its outer end an actuating button 131. It will be evident that by pushing in on button 131, the rod 130 will be axially moved in a direction to rotate the yoke 129 in a clockwise direction as shown in Figure 8 until it engages a peripheral end flange 132 which is integrally formed at the open end of member 124. This will cause member 124 to be shifted to unclutched position relative to sleeve 122, whereupon the pointer is free to be returned to a position against the stop pin 126 by the spring 127.

Associated with the pointer 115 is a plate 133 which is supported for movement therewith. Supported on the bracket 109 is a switch supporting bracket 134 to which there is adjustably secured a switch base 135 by screws 136 which are disposed in an arcuate slot 137 to enable limited adjustment of the switch base circumferentially about the center of rotation of the pointer 115. Projecting from the switch base 135 are a pair of flexible contact supporting arms 137 and 138 which carry at their outermost ends contact points 139 and 140, these contact points normally being in separated position. The contact arm 137 at its outer end is provided with a cam surface 141 which is disposed in the line of travel of member 133 so that as the pointer 115 moves over its associated dial, it will cause the contacts 139 and 140 to assume closed position when the switch just described has been reached by the pointer. It will be apparent, that closing of these contacts may be advanced or retarded relative to the position of the pointer by shifting the switch base one way or the other at its adjustable connection with the bracket 134. Immediately after the pointer has passed the switch, the contacts thereof will again assume open position.

Inasmuch as there is a possibility that there may be times when the oil which is being tested may have a viscosity exceeding the capacity of the dial, limit switch means 142 are provided, this switch having normally closed contacts 143 which are arranged to be opened by being contacted by the member 133 when the pointer 115 has traversed the entire dial and has assumed a position adjacent the opposte side of stop pin 126 as shown in Figure 9. The switch contacts 143 are placed in the control circuit of the operating motor 112 so that when the limit of the dial has been reached, the contacts 143 will be open to stop the driving motor. This operation will be more evident when the control circuits for the apparatus of this invention are described in detail.

Referring now to Figure 10, the control circuits of the apparatus will now be described.

The supply circuit is represented by electric conductors 144. The head casing 102 is internally illuminated by a pair of incandescent lamps 145—145 and the housing 20 is interiorly illuminated by an incandescent lamp 146. These lamps are connected in multiple across the supply circuit 144, a conductor 147 being common to one set of the lamp terminals. The other terminals of the lamps 145 are interconnected through a conductor 148, a control switch 149, and thence to conductors 150 to the other side of the supply circuit 144. The lamp 146 is likewise on a separately controlled circuit and its other terminal is connected through a conductor 151, a switch 152 and thence to conductor 150 and the other side of the supply circuit.

The heating element 36 for the lower plate 28 has one terminal connected through conductor 153 to conductor 147 which is connected to one side of the supply circuit, and its other terminal connected through the normally closed switch contacts of the thermostatically controlled switch 42 by conductor 154 which is connected to conductor 150, this latter conductor being connected to the other side of the supply circuit. The thermostatically operated switch automatically opens and closes its contacts to control the heating of the lower plate 28 in such a manner as to maintain the temperature substantially constant at some desired value.

Assuming now that a specimen of oil be placed between the plates 27 and 28 and that these plates be actuated by pushing down on the knob 61 to close position, the knob 61 will be latched down to hold the plate in close position by means of latch member 91 under the influence of spring 92, this action closing the contacts of switch 86 to energize motor 112 through the following circuit:

From one side of the supply circuit 144 through conductor 155, contacts 86, conductor 156, the contacts of switch 142 and thence through conductor 157 to one terminal of the motor.

From the other terminal of the motor the circuit will be through conductor 158, switch 159, and thence through conductor 160 to the other side of the supply circuit.

The motor 112 having now been energized, will start to run and will rotate the pointer 115 in a clockwise direction. Member 133 after a predetermined interval of time has elapsed in the movement of pointer 115 will function to close contacts 139 and 140. Closure of these contacts will energize coil 95 to release the latch 91. Coil 95 is energized through the following circuit:

From one side of the supply circuit, through conductor 155 to one terminal of coil 95, from the other terminal of coil 95 through conductor 161 to contacts 139 and 140, thence to conductor 162, conductor 163, and conductor 160 to the other side of the line.

Coil 95 having been energized to release the latch 91, the knob 61 will be raised by the action of springs 70–73. There is now a tendency due to the action of spring 81 for the plate 27 to be raised or moved to apart position relative to the lower plate 28, but this movement of plate 27 is resisted by the surface tension of the oil between these plates.

The point at which the pointer closes switch contacts 139 and 140 determines the starting of the test operation, and it will be seen that this test always starts at the same point or position of the pointer relative to the dial 116.

The pointer continues to traverse the dial until such time as the force of spring 81 overcomes the surface tension of the specimen of oil being tested, whereupon the plate 27 is separated from plate 28 with the result that the contacts of switch 86 are now opened. Since these contacts are in the supply circuit of motor 112, the motor will be deenergized and the pointer will stop. Reading of the viscosity indicia as indicated by this pointer gives the operator a direct reading of the viscosity of the oil under test.

The pointer is then returned to position against the stop pin 126 by actuating the push rod button 131.

The switch 159 in the motor circuit is of the manually operable tumbler type, and it is provided for opening the motor circuit when it is desired to bring the plates 27 and 28 together without starting the motor 112 of the timing mechanism. Such a condition of operation might be desirable when the apparatus has been shut down for a considerable period of time and the plates have cooled off. Since the lower plate 28 is the only one which is heated in the present illustrated embodiment of the invention, the heating of the upper plate 27 may be considerably speeded up by bringing it into close engagement relative to the lower plate. The provision of the manually operable switch 159, however, would in itself be objectionable in that this switch would provide means by which the attendant or operator could prematurely stop the operation of the motor 112 before the actual completion of the test of an oil specimen. Under these conditions, the apparatus would indicate that the oil under test had a lower viscosity than it might actually have. Thus an operator might by unscrupulous operation of the switch 159, sell the customer oil which he did not in reality need.

In order to prevent unscrupulous operation of this character, there is provided a relay 164 having normally closed contacts 165 and an operating coil 166. This relay is mounted in the hollow interior of standard 17 at any place which is most convenient.

This relay is arranged so that its operating coil 166 will be energized when the contacts 139 and 140 are closed to begin the actual testing operation. The operating coil will be energized through the following circuit:

From one side of the supply circuit 144, through conductor 155, switch contacts of switch 86, through conductor 156, conductor 167 to one terminal of the coil. From the other terminal of the coil through the normally closed contacts 165 of the relay, conductor 168, conductor 161, contacts 139 and 140, conductor 162, conductor 163, and conductor 160 to the other side of the supply circuit.

Since contacts 139 and 140 immediately assume open position as soon as the pointer has passed by them, it is necessary to interlock the relay 164 in a position with its normally closed contacts open. This is accomplished by providing three separate contacts 169 on the relay, these contacts being normally open but being closed when the contacts 165 are open. One of the contacts 169 is connected in multiple to the contact 165 which is connected to the operating coil terminal. The remaining two contacts are respectively connected by conductors 163 and 170 to the terminals of switch 159. It will therefore be evident that once the actual testing operation has started and relay 164 has closed its upper contacts 169, the switch 159 will be short circuited so that should the attendant endeavor to prematurely stop the motor 112 by opening the switch 159, the opening of this switch would be ineffective to stop the motor and the test would continue to completion.

In the energized position of relay 164, the operating coil is energized through the following circuit:

From one side of the supply circuit 144, through conductor 155, the contact points of switch 86, conductor 156, conductor 167, through coil 166, through contacts 169 and said parallel conductors 163 and 170 to conductors 158 and 160, which in this instance are either connected or unconnected by the switch 159, and thence through conductor 160 to the other side of the supply circuit. Since this circuit contains switch 86, it will be appreciated that at the conclusion of the testing operation, at which time the contacts of switch 86 are open, the operating coil 166 of relay 164 will be deenergized and the relay will assume its normal position ready for a subsequent test of oil.

From the foregoing description of the construction and operation of the apparatus embodying the present invention, it will be apparent that the invention provides improved apparatus for testing the viscosity of a fluid such as oil in which the actual testing operation and the timing of the interval or duration of the testing operation are started and terminated automatically at precisely the same time so that any errors due to misjudgment on the part of an operator will be eliminated in apparatus of this type; in which the operator may manually control the operation of the timing motor, during initial heating of the plate, but where the manual control is automatically rendered inoperative once an actual test of oil has been started; which provides means for automatically stopping the timing means in the event that the maximum capacity of the indicating mechanism is reached; and which includes an improved arrangement of the parts of the mechanism for testing the oil specimen wherein the operator may raise the upper testing plate and latch it in that position, so that the operator may use both hands for cleaning the plates and for other duties in connection with the operation of the device.

Now, it is, of course, to be understood that although I have described in detail the preferred embodiment of my invention, the invention is not to be thus limited, but only insofar as defined by the scope and spirit of the appended claims.

I claim as my invention:

1. Apparatus for determining characteristics of a liquid comprising two opposed surfaces mounted for relative movement into close and apart relationship and adapted to receive therebetween a film of liquid of determinate thickness, means actuatable to initially move said surfaces to close position, means for thereafter applying a predetermined force tending to move said surfaces apart, means for latching said surfaces against said tendency, means for releasing said latch, and timing means operable to measure the time interval required for said force to move said surfaces to apart position after releasing said latch means.

2. Apparatus for determining characteristics of a liquid comprising two opposed surfaces mounted for relative movement into close and apart relationship and adapted to receive therebetween a film of liquid of determinate thickness, means actuatable to initially move said surfaces to close position, means for thereafter applying a predetermined force tending to move said surfaces apart, means for latching said surfaces against said tendency, timing means, means operable in response to the movement of said surfaces to close and apart positions for respectively energizing and deenergizing the timing means, and means operable after the lapse of a predetermined interval to release said latch to begin the measuring of the time interval required for said force to move said surfaces to apart position.

3. Apparatus for determining characteristics of a liquid comprising two opposed surfaces mounted for relative movement into close and apart relationship and adapted to receive therebetween a film of liquid of determinate thickness, spring means acting to force said surfaces apart against the cohesion of said film, timing means energized and deenergized in response to the movement of said surfaces for measuring the interval the cohesion of said film resists said spring, manually operable means for controlling the timing means, and means automatically operable to render the manually operable means inoperative to stop the timing means once the timing interval has started.

4. In an apparatus of the character described for testing a characteristic of a liquid, two opposed surfaces mounted for relative movement into close and apart relationship and adapted to receive the test liquid therebetween, spring means having a tendency to force said surfaces apart, means for latching said surfaces closed, timing means for measuring the interval of time for the test and primarily started and stopped by movement of said surfaces, means for releasing said latch after a predetermined time interval to begin the timing of a test interval, means for maintaining one of said surfaces at a substantially constant temperature, control means manually operable to render the timing means inoperative and enable movement of the plates to close position to enable preliminary heating of the other surface by conduction, and automatic means operative once the timing interval has begun to render said manual control means inoperative relative to the timing means.

5. In an apparatus of the type described for testing a characteristic of a liquid and including a pair of relatively movable testing elements adapted to receive the test liquid therebetween and be urged apart to test the liquid; timing means primarily started and stopped in response to the operation of said elements for measuring the testing interval, said means including a dial and a hand traversing said dial, means operative upon the hand reaching a predetermined position relative to said dial, whereby the testing interval is begun, and limit means to stop the timing means when the maximum dial limit is reached.

6. In an apparatus of the type described for testing a characteristic of a liquid and including a pair of relatively movable testing elements adapted to receive the test liquid therebetween and be urged apart to test the liquid; electrically actuated timing means primarily started and stopped in response to the movement of said elements for measuring the testing interval and having an energizing circuit, said means including a dial and a hand traversing said dial, means electrically energizable to start the test of said characteristic of the liquid by said elements, and a switch actuatable in response to the movement of said hand for controlling the energization of said latter means, whereby the starting of the test and the timing operation are substantially coincident, and a switch in the energizing circuit of the timing means operable to stop the timing means when the capacity of the dial is reached.

7. In an apparatus of the type described for testing a characteristic of a liquid and including a pair of relatively movable testing elements adapted to receive the test liquid therebetween and be urged apart to test the liquid; electrically actuated timing means primarily started and stopped in response to the movement of said elements for measuring the testing interval, said means including a dial and a hand traversing said dial, means electrically energizable to start the test of said characteristic of the liquid by said elements, and a switch actuatable in response to the movement of said hand for controlling the energization of said latter means, whereby the starting of the test and the timing operation are substantially coincident.

8. In an apparatus of the type described for measuring a characteristic of a liquid and including a pair of relatively movable testing elements adapted to be urged apart to test the liquid; timing means primarily started and stopped in response to the movement of said elements for measuring the testing interval, said means including a dial and a hand traversing said dial, means energized upon the hand reaching a predetermined position relative to said dial for releasing the testing elements for relative movement, whereby the testing interval is begun, and means whereby the hand may be returned to normal position at the termination of the test.

9. In an apparatus of the type described for testing a characteristic of a liquid and including a pair of relatively movable testing elements adapted to receive the test liquid therebetween and be urged apart to test the liquid; timing means primarily started and stopped in response to the movement of said elements for measuring the testing interval, said means including a dial and a hand traversing said dial, a switch operative in response to the hand reaching a predetermined position relative to said dial for determining the beginning of the testing interval, and adjustable mounting means for said switch, whereby its operation may be advanced or retarded relative to the timing means.

10. Apparatus of the character described comprising two plates adapted to receive a specimen of liquid therebetween and arranged for relative movement to close position to establish a film of liquid therebetween and to apart position to test the resistance of said film to said latter movement, and means for latching said plates in apart position to facilitate cleaning thereof, said means including a member reciprocably mounted in a support and connected to one of said plates, whereby one of said plates may be moved relative to the other.

11. Apparatus of the character described comprising two plates adapted to receive a specimen of liquid therebetween and arranged for relative movement to close position to establish a film of liquid therebetween and to apart position to test the resistance of said film to said latter movement, a support, a member reciprocably mounted in said support and connected to one of said plates, whereby one of said plates may be moved relative to the other, and means for latching said plates in apart position to facilitate cleaning thereof, said means comprising a jointed end section of said member, whereby the jointed section may be tilted relative to said support when withdrawn therefrom.

12. Apparatus for determining characteristics of a liquid comprising two opposed and relatively movable surfaces adapted to receive therebetween a film of liquid of determinate thickness, means to initially apply a force in a direction to move said surfaces together and after a predetermined time interval apply a force tending to separate said surfaces, and timing means to measure the time interval required for said latter force to separate said surfaces.

13. Apparatus of the class described comprising two surfaces adapted to receive a specimen of liquid therebetween and arranged for relative converging motion to establish a film of the liquid between said surfaces and arranged for relative separating motion to test the resistance of said film to said separating motion, means operable to establish a pressure to cause said relative converging motion, means for timing the interval that said pressure is effective, pressure creating means tending to cause said relative separating motion, and means for indicating the time interval that the film resists said latter pressure creating means.

14. Apparatus for determining characteristics of a liquid comprising two opposed surfaces mounted for relative movement into close and apart relationship and adapted to receive therebetween a film of liquid of determinate thickness, said surfaces being adapted to be maintained at a substantially constant temperature, means for maintaining said surfaces at said temperature, means actuatable to move said surfaces to close position, means for thereafter applying a force tending to move said surfaces apart, means initially opposing said tendency, and timing means operable at the termination of an initial time interval to render said opposing means ineffective and begin the measuring of the time interval required for said force to move said surfaces to apart position.

CLIFFORD S. HEALY.